Figure 1:
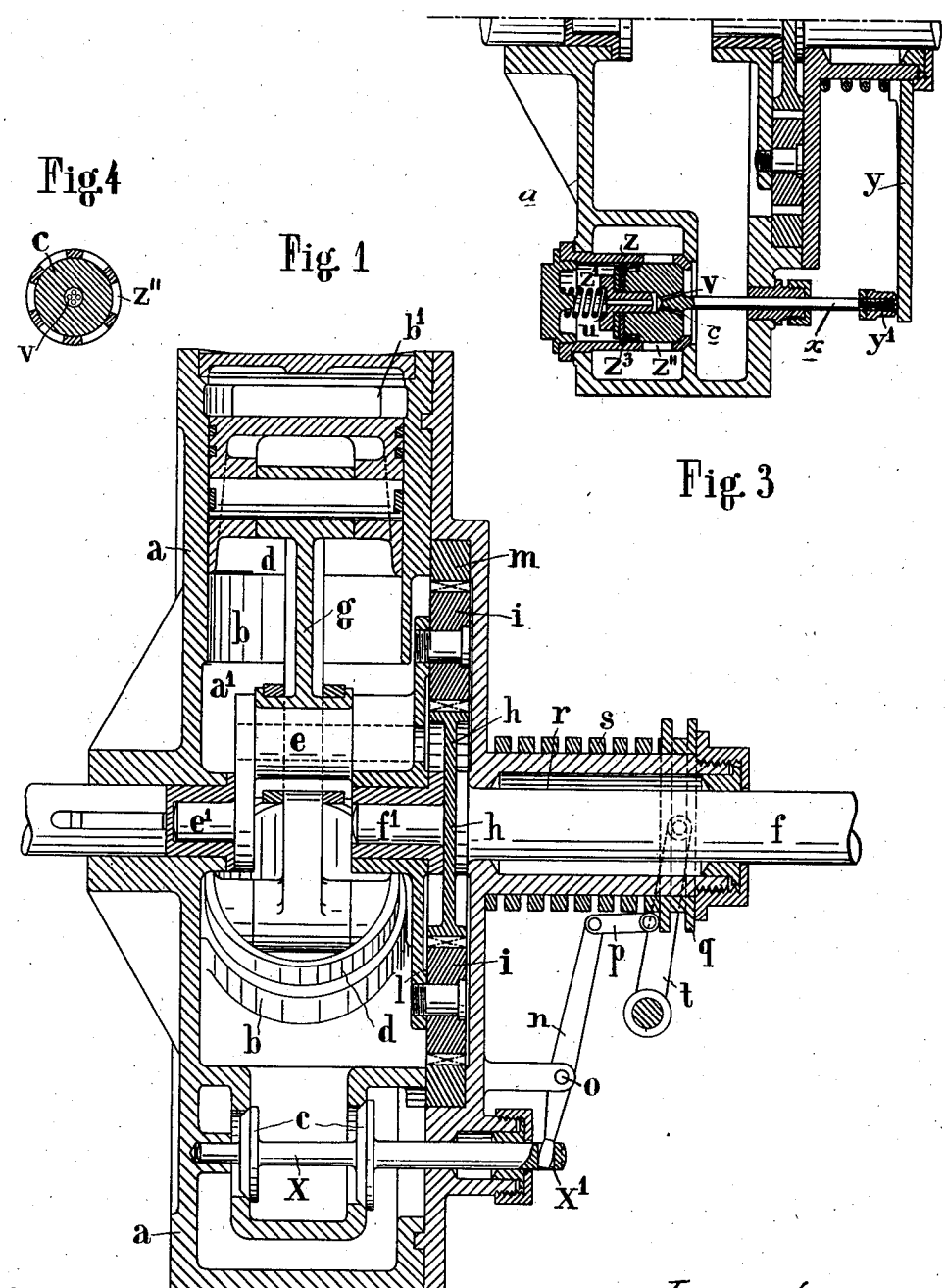

W. G. CLIFTON.
POWER TRANSMISSION MECHANISM.
APPLICATION FILED DEC. 2, 1907.

929,556.

Patented July 27, 1909.
2 SHEETS—SHEET 2.

Witnesses:
A. G. Ernst
G. W. Fowler

Inventor:
William George Clifton
By J. Walter Fowler
his atty.

UNITED STATES PATENT OFFICE.

WILLIAM GEORGE CLIFTON, OF HIGHBURY, LONDON, ENGLAND.

POWER-TRANSMISSION MECHANISM.

No. 929,556.  Specification of Letters Patent.  Patented July 27, 1909.

Application filed December 2, 1907. Serial No. 404,682.

*To all whom it may concern:*

Be it known that I, WILLIAM GEORGE CLIFTON, engineer, a subject of the King of England, and residing at 35 Stavordale road, Highbury, London, England, have invented a certain new and useful Improvement in Power-Transmission Mechanism, of which the following is a full, clear, and exact description, and for which I have applied for Letters Patent in Great Britain, No. 27,939, dated December 7, 1906.

This invention relates to improvements in power transmission mechanism, and is particularly applicable to clutches in which the working fluid is arranged to resist the relative motion of two or more moving parts when power is to be transmitted, and to be trapped absolutely between the said parts when the transmission is to be effected without slipping. Such an apparatus is known in which the liquid is forced by means of pistons through cocks of which the opening is variable at will. By the manipulation of these cocks the resistance offered by the liquid to the motion of the pistons may be increased to any desired extent, and in the final position when the cocks are closed, the imprisoned liquid is designed to prevent any further movement of the pistons within their cylinders so that the transmission of power may take place without loss.

It is found in practice in connection with hydraulic clutches of this class, especially when they are employed on high speed driving shafts (as for instance upon automobile vehicles) that although the engagement and driving under load are extremely satisfactory, yet when the clutch is in the nominally "free" position there is a marked tendency for the driven shaft to continue its rotation. This is more noticeable when the load is released from this shaft simultaneously with the movement to the free position. Such a case occurs, for example, in the changing of gear upon an automobile vehicle; in this case it is very desirable that the driven shaft should be absolutely disconnected from the source of power in order that the change may be effected without inconvenience.

The present invention relates to an improvement in the construction of hydraulic clutches of this class for the purpose of reducing this tendency to continued rotation after the withdrawal of the clutch.

The invention consists of the introduction of an intermediate member to carry or be connected with one set of the moving parts of which the relative movement is to be obstructed. The other set of moving parts is as usual carried by or connected with one of the extreme members, e. g. the driver. This intermediate member is connected to both the driver and the follower by suitable gearing, in such a manner that it revolves at a speed which is a convenient mean of the speeds of the extreme members. By this arrangement the relative speed of the two sets of moving parts is reduced so that the resistance of the liquid when the clutch is in the free position is diminished. In the driving position, since the lock is designed to be absolute, no slipping of the clutch takes place.

The invention is hereafter described with reference to the accompanying drawing, in which:—

Figure 2:
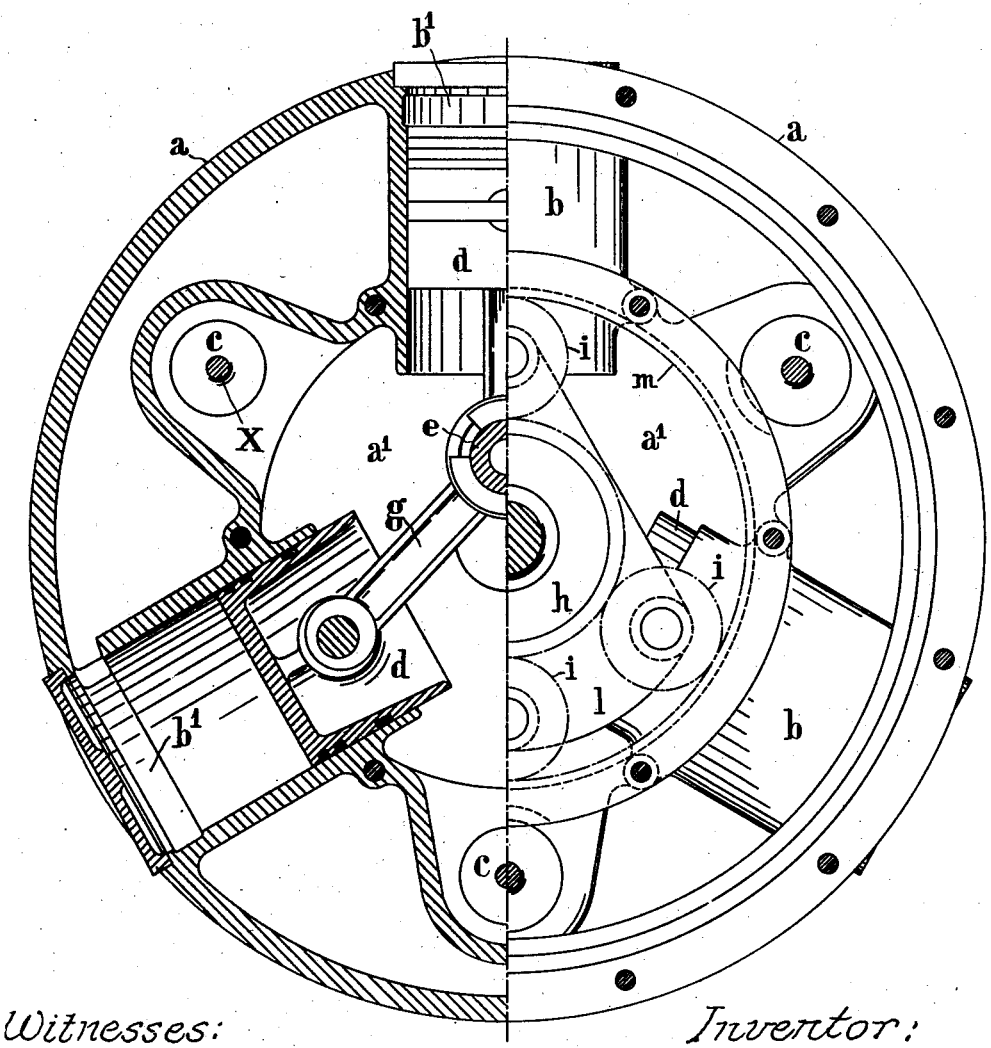

Figure 1 is a central sectional elevation of a clutch of the type described, to which the present invention has been applied. Fig. 2 is an end view with the cover plate removed, the left half being in part section. Fig. 3 is a section on a smaller scale of a modified form of valve and operating means. Fig. 4 is a sectional plan of the modified valve.

The flywheel or driver $a$ carries a number of radial cylinders $b\ b\ b$ integral therewith, each head end $b'$ being connected through a suitable cock or valve $c$ with a chamber to afford a circulation system; I show for this purpose in the drawings a common central chamber $a'$, the pistons being of the trunk type. The pistons $d$ are operated through connecting rods $g$ from a crank pin $e$ placed eccentrically of the axis of the flywheel $a$. The driven shaft or follower $f$ enters the casing through a stuffing box $r$ and carries a gear wheel $h$ forming the sun wheel of an epicyclic train. The planet wheels $i\ i$ are mounted upon a spider $l$ which runs freely upon an extension $f''$ of the driven shaft $f$ and carries the crankpin $e$ operating the pistons aforesaid. The other extremity of the crankpin may be provided with a crank web and an axle $e'$ which revolves freely in a bearing central of the flywheel. An internal gear wheel $m$ meshing with the planet pinions $i\ i$ is rigidly secured to the flywheel itself.

The casing afforded by the driver and inclosing the cylinders $b$ and other parts as well as the system of gearing $h\ i\ m$ is wholly or in part filled with oil or other suitable liquid; and means are provided for simultaneously opening or closing the cocks, so as to allow or to prevent relative movement of the pistons within their cylinders, for example the levers $n$ fulcrumed at $o$ to the casing, the one end of said levers being connected by links $p$ to a collar $q$ sliding on the stuffing box $r$ and the other end of said lever acting in a slot $x'$ of the stem $x$ of valve $c$. A spring $s$ maintains the levers $n$ in such a position that the valves are closed, and a forked operating lever $t$ engages this collar so that the latter may be slid along its support.

In Figs. 3 and 4 the valve $c$ is shown provided with a stem $x$ having an adjustable cap $y'$ bearing against the operating disk $y$. Valve $c$ is a multiple-ported piston valve sliding in a cylindrical seating $z$ screwed into the flywheel $a$. A spring $z'$ presses the valve into the closed position and a hollow screw $u$ centers the said spring. Ports $z''$ are shown in the valve $c$ and passages $v$ are provided to allow of the flow of liquid through the valve. The valve carries a packing ring $z^3$ which is retained in place by the screw $u$.

It will be seen that when the cocks are entirely closed, relative motion is prevented between two members of the epicyclic train. The whole therefore rotates as one piece and the motion of the driver is transmitted directly to the sun gearwheel and so to the follower without slip. In the free position, when the follower is stationary, the driver and the intermediate member revolve in the same direction at different speeds, according to the proportions given to the gearing. The difference in speed may be half, one-third or one-fourth of the speed of the driver, or any other suitable fraction. Then since the resistance of the liquid will vary approximately as the square of its speed of displacement the tendency of the intermediate member carrying the second set of moving parts to participate in the motion will be reduced to one-fourth, one-ninth or one-sixteenth respectively of the tendency of the second set of moving parts in the case of a clutch of the usual construction. According to the above ratios for the epicyclic gear, the torque experienced by the follower will be still further reduced from that affecting the intermediate member in the proportion of one-half, one-third or one-fourth. The torque upon the following shaft will therefore be reduced to one-eighth, one-twenty-seventh, or one sixty-fourth of that in a similar clutch of the usual design. By suitably designing these proportions, it becomes therefore an easy matter to obtain as great freedom as may be desired for the follower in the non-driving position.

Having thus described my invention, what I claim as such and desire to secure by Letters Patent is:—

1. A power transmission mechanism, comprising hydraulic cushioning means, driving and driven members, and a member rotating at a definite intermediate speed and connected to one of the said members by the hydraulic cushioning means.

2. A power transmission mechanism comprising hydraulic cushioning means, driving and driven members, and a member rotating at a definite intermediate speed and connected to said driving member by the said hydraulic cushioning means.

3. A power transmission mechanism, comprising hydraulic cushioning means, having two sets of moving parts, driving and driven members of said clutch, one of said sets of moving parts being provided upon one of said members, and a member provided with the other of said sets and rotating at a definite and intermediate speed.

4. A power transmission mechanism, comprising hydraulic cushioning means, having two sets of moving parts, driving and driven members of said clutch, one of said sets of moving parts being provided upon one of said members, and an intermediate member provided with the other of said sets, and a gearing connecting said intermediate member with the driving and driven members.

5. A power transmission mechanism, comprising hydraulic cushioning means, having two sets of moving parts, a driving member provided with one of said sets, a driven member and members provided with the other of said sets of moving parts and rotating at a definite intermediate speed.

6. A power transmission mechanism, comprising hydraulic cushioning means, having two sets of moving parts, a driving member provided with one of said sets, a driven member, an intermediate member, and gearing connecting the intermediate member to both the driving and driven members.

7. A power transmission mechanism, comprising hydraulic cushioning means, having two sets of moving parts, a driving flywheel provided with one of said sets, a driven shaft, and a member provided with the other of said sets and rotating at a speed intermediate between said flywheel and said shaft.

8. A power transmission mechanism, comprising hydraulic cushioning means having two sets of moving parts, a driving flywheel provided with one of said sets, a driven shaft, an intermediate member provided with the other of said sets, and gearing connecting the intermediate member to both said flywheel and said shaft.

9. A power transmission mechanism, comprising hydraulic cushioning means having two sets of moving parts, a driving flywheel provided with one of said sets, a gear wheel upon said flywheel, a driven shaft, a gear wheel upon said shaft, an intermediate member provided with the other of said sets, and gear wheels upon said intermediate member meshing with said gear wheels upon said flywheel and said shaft.

10. A power transmission mechanism, comprising hydraulic cushioning means having two sets of moving parts, a driving flywheel provided with one of said sets, an internal gear wheel upon said flywheel, a driven shaft, a sun gearwheel upon said shaft, an intermediate member provided with the other of said sets, and epicyclic pinions upon said intermediate member meshing with said internal gearwheel and said sun gearwheel.

11. A power transmission mechanism, comprising a flywheel, cylinders mounted in said flywheel, pistons within said cylinders, liquid circulated by the movement of said pistons, a crankpin, connections from said crankpin to said pistons, a spider carrying said crankpin, a shaft, said spider rotating at a definite intermediate speed in relation to said flywheel and said shaft, and means for varying the resistance to the circulation of said liquid.

12. A power transmission mechanism, comprising a flywheel, cylinders mounted in said flywheel, pistons within said cylinders, liquid circulated by the movement of said pistons, a crankpin, connections from said crankpin to said pistons, a spider carrying said crankpin, a shaft, gearing connecting said spider to said flywheel and said shaft, and means for varying the resistance to the circulation of said liquid.

13. A power transmission mechanism, comprising a flywheel, cylinders mounted in said flywheel, pistons within said cylinders, liquid circulated by the movement of said pistons, a gearwheel upon said flywheel, a crankpin, connections from said crankpin to said pistons, a spider carrying said crankpin, a shaft, a gear wheel upon said shaft, gearwheels upon said spider meshing with said gearwheels upon said shaft and said flywheel and means for varying the resistance to the circulation of said liquid.

14. A power transmission mechanism, comprising a flywheel, cylinders mounted in said flywheel, pistons within said cylinders, liquid circulated by the movement of said pistons, an internal gearwheel upon said flywheel, a crankpin, connections from said crankpin to said pistons, a spider carrying said crankpin, a shaft, a sun gearwheel upon said shaft, epicyclic pinions upon said spider meshing with said internal gearwheels and means for varying the resistance to the circulation of said liquid.

15. A power transmission mechanism, comprising a flywheel, cylinders mounted in said flywheel, pistons within said cylinders, liquid circulated by the movement of said pistons, a crankpin, connections from said crankpin to said pistons, a spider carrying said crankpin, a shaft, said spider rotating at a definite intermediate speed in relation to said flywheel and shaft, and adjustable cocks resisting the circulation of said liquid.

16. A power transmission mechanism, comprising a flywheel, cylinders mounted in said flywheel, pistons within said cylinders, liquid circulated by the movement of said pistons, a crankpin, connections from said crankpin to said pistons, a spider carrying said crankpin, a shaft, gearing connecting said spider to said flywheel and said shaft, and adjustable cocks resisting the circulation of said liquid.

17. A power transmission mechanism, comprising a flywheel, cylinders mounted in said flywheel, pistons within said cylinders, liquid circulated by the movement of said pistons, a gearwheel upon said flywheel, a crankpin, connections from said crankpin to said pistons, a spider carrying said crankpin, a shaft, a gearwheel upon said shaft, gearwheels upon said spider meshing with said gearwheels upon said shaft and said flywheel and adjustable cocks resisting the circulation of said liquid.

18. A power transmission mechanism, comprising a flywheel, cylinders mounted in said flywheel, pistons within said cylinders, liquid circulated by the movement of said pistons, an internal gearwheel upon said flywheel, a crankpin, connections from said crankpin to said pistons, a spider carrying said crankpin, a shaft, a sun gearwheel upon said shaft, epicyclic pinions upon said spider meshing with said internal gearwheel, and adjustable cocks resisting the circulation of said liquid.

In witness whereof I have hereunto set my hand in presence of two witnesses.

WILLIAM GEORGE CLIFTON.

Witnesses:
  VICTOR F. FEENY,
  CYRIL J. FEENY.